May 31, 1960    O. A. KERSHNER ET AL    2,938,607
MECHANICAL ACTUATOR MEANS FOR DISC BRAKES
Filed June 28, 1957    4 Sheets-Sheet 1

INVENTORS
OSBORN A. KERSHNER
HONG-JI TSAI
BY *Robb & Robb*
ATTORNEYS

May 31, 1960   O. A. KERSHNER ET AL   2,938,607
MECHANICAL ACTUATOR MEANS FOR DISC BRAKES
Filed June 28, 1957   4 Sheets-Sheet 2
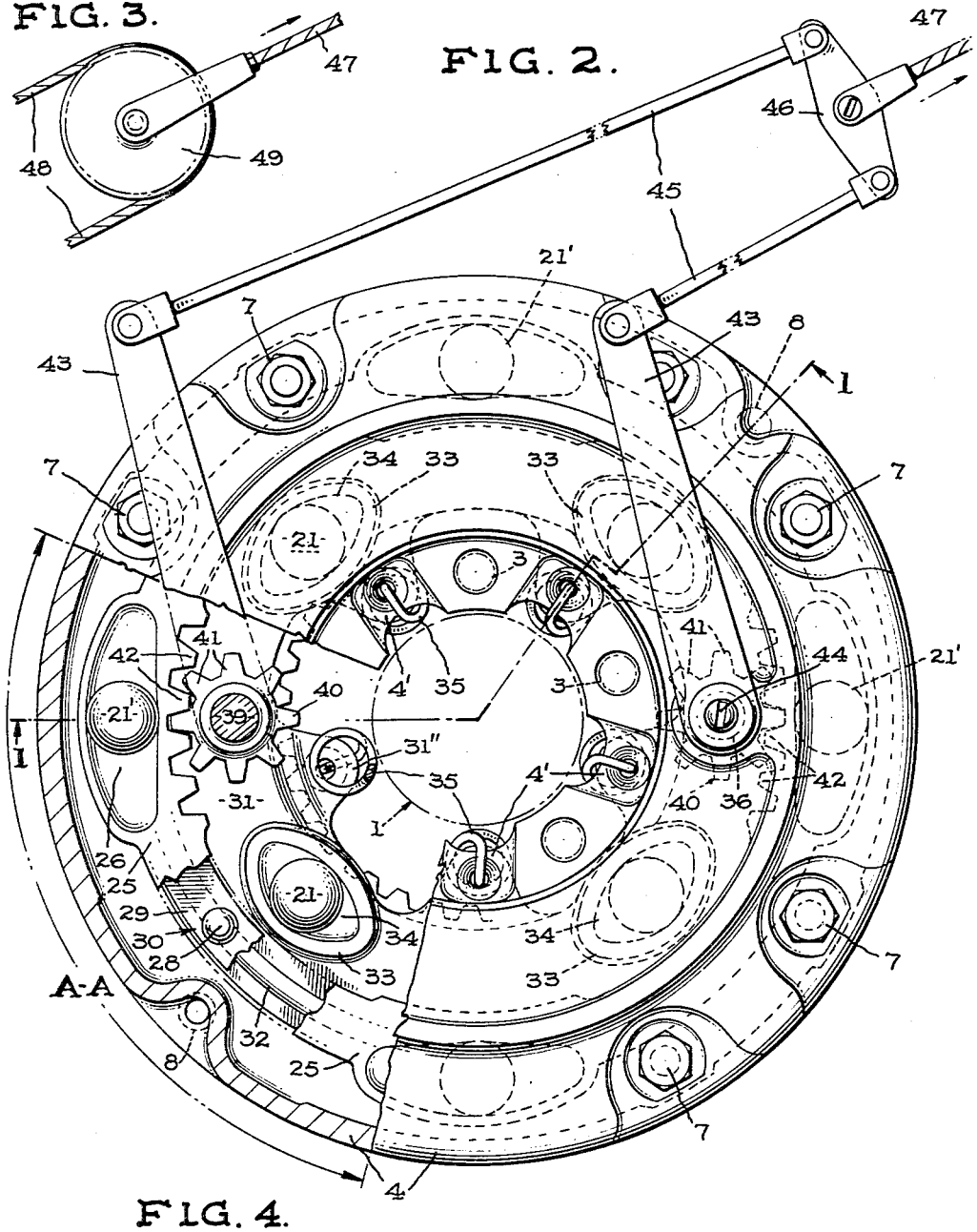
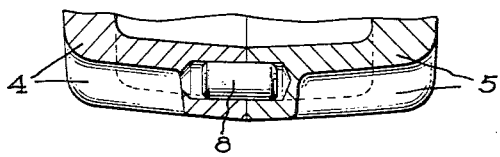
INVENTORS
OSBORN A. KERSHNER.
HONG-JI TSAI
BY
ATTORNEYS

INVENTORS
OSBORN A. KERSHNER
HONG-JI TSAI
BY
ATTORNEYS

May 31, 1960
O. A. KERSHNER ET AL
2,938,607
MECHANICAL ACTUATOR MEANS FOR DISC BRAKES
Filed June 28, 1957
4 Sheets-Sheet 4
FIG. 6.
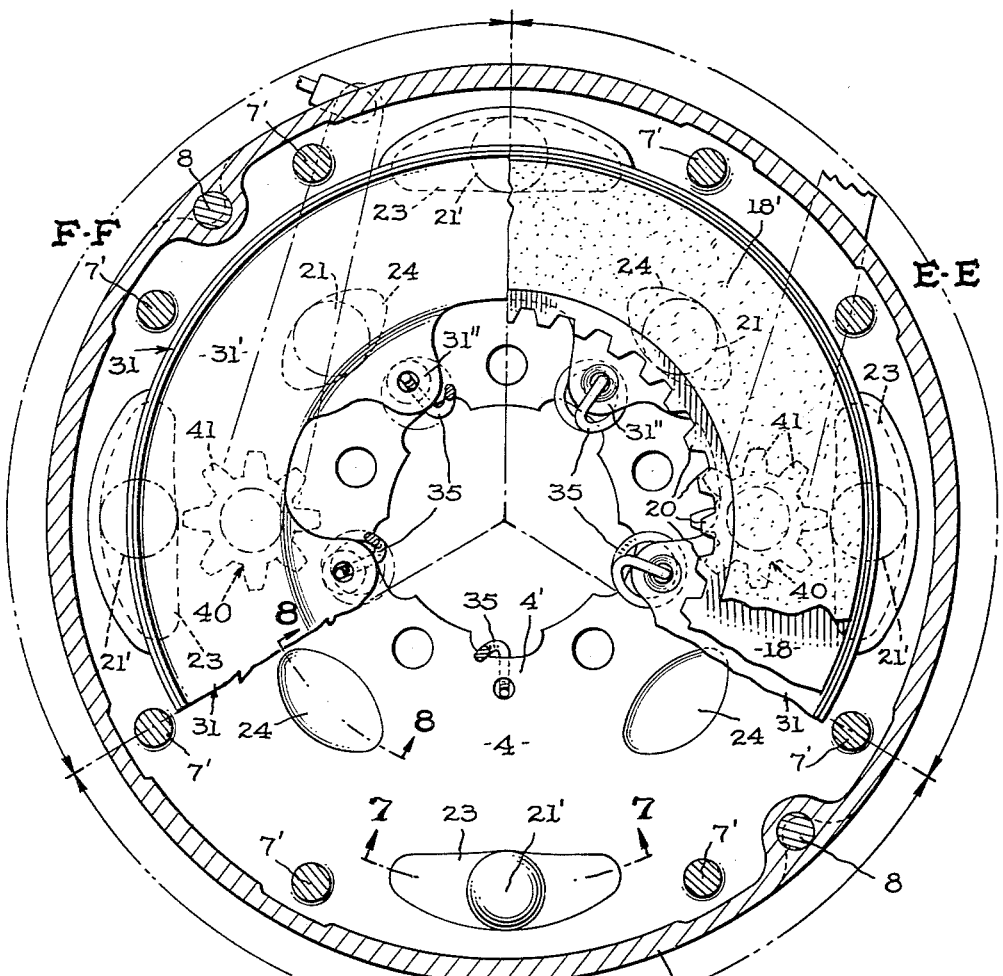
FIG. 7.
FIG. 8.
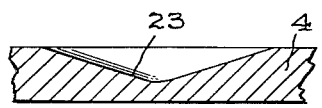
INVENTORS
OSBORN A. KERSHNER
HONG-JI TSAI
BY 
ATTORNEYS

United States Patent Office 2,938,607
Patented May 31, 1960

2,938,607

MECHANICAL ACTUATOR MEANS FOR DISC BRAKES

Osborn A. Kershner, St. Joseph, and Hong-Ji Tsai, Benton Harbor, Mich., assignors, by mesne assignments, to Lambert Brake Corporation, St. Joseph, Mich., a corporation of Michigan Filed June 28, 1957, Ser. No. 668,716

5 Claims. (Cl. 188—72)

The present invention relates to friction devices, and more particularly to disc brakes having improved means for mechanically effecting actuation or operation of the brake, while permitting torque-responsive self-energizing thereof.

Brakes of this general type are adaptable for use on both self-propelled and drawn classes of vehicles, as well as on other machinery or implements having a rotary member to be braked, and are more particularly adaptable to vehicles such as tractors, airport hauling equipment, house trailers and the like.

Heretofore, some brakes of this class have utilized various forms of linkage and/or lever means which, when pushed or pulled, effect the initial operation of a brake-actuating disc which, in turn, effects the full operation of the brake as a whole. The aforesaid brake operation has generally been responsive to the application of a radially exerted force on the brake actuating and/or friction disc means as applied in a predetermined direction.

The aforementioned radially exerted force or stress has resulted in an excessive bearing load concentration at the piloting diameter or bearing surface of the brake actuating disc means relative to the brake housing or other mounting means; and said load concentration has tended to considerably reduce the efficiency of the self-energizing action of the brake in that frictional forces coincident to the excessive bearing loads aforementioned work against the self-energizing means during the braking action, resulting in an uneven distribution of brake applying forces.

Accordingly, a principal object of this invention is to provide an improved brake construction having novel mechanical means for operating the brake without excessive bearing loads being imparted to any part of the braking mechanism.

Another principal object is to provide novel means for mechanically operating the actuator disc means of a disc brake of the aforementioned type, said mechanical operating means including a rockable or partially rotatable operator lever suitably connected with a pinion gear which is intermeshed with a ring gear or actuating ring, said actuating ring in turn conditioning the actuator disc means for torque-responsive self-energization of the brake.

A further object is to provide a novel mechanical means for actuating the aforementioned actuator disc means, whereby an initial tangential operating force is applied in such a manner as to preclude any undesirable concentration of operating stress which will adversely affect free and efficient energization of the brake.

Among further objects and advantages is the utilization of an improved and novel construction that will provide a more uniform distribution of axial braking force on the friction surfaces of the brake assembly, with resultant more even distribution of the heat generated by braking applications. This uniform distribution of axial braking force is accomplished by first applying a tangential force to a partially rotatable actuating ring member which acts through cam means to move a primary actuator disc axially into torque-responsive self-energizing relation with the friction surfaces of the brake, thereby converting said tangential force into an evenly distributed axial force over the entire area of the friction disc components, with consequent assurance of smoother operation, more effective energization and maximum life of the brake components.

Other objects and advantages of the invention will be hereinafter described or will become apparent to those skilled in the art, and the novel features thereof defined in the appended claims.

In the drawings:

Fig. 2 is an inboard elevation view of the brake, showing the operator lever means, and with the inboard housing member partially broken away to the quadrant or sector A—A as viewed substantially on line A—A of Fig. 1;

Fig. 3 is a fragmentary view showing an alternative pulley means for equalizing the operating force exerted on the two operating levers shown in Fig. 2;

Fig. 4 is a fragmentary cross-sectional view taken radially through the outer marginal portion of the housing to show the detail of the housing-aligning and strengthening dowel pin construction;

Fig. 6 is also a composite sectional view similar to that of Fig. 5, but showing three different cross-sectional sectors indicated at E—E, F—F and G—G, as viewed substantially on their correspondingly designated section lines of Fig. 1;

Fig. 7 is a cross-sectional view taken longitudinally through one of the ramped ball seats near the outer periphery of the inboard housing member, as viewed on line 7—7 of Fig. 6; and Fig. 8 is a cross-sectional view taken longitudinally through one of the ramped ball seats nearer the inner periphery of the inboard housing member, as viewed on line 8—8 of Fig. 6.

Figure 1:
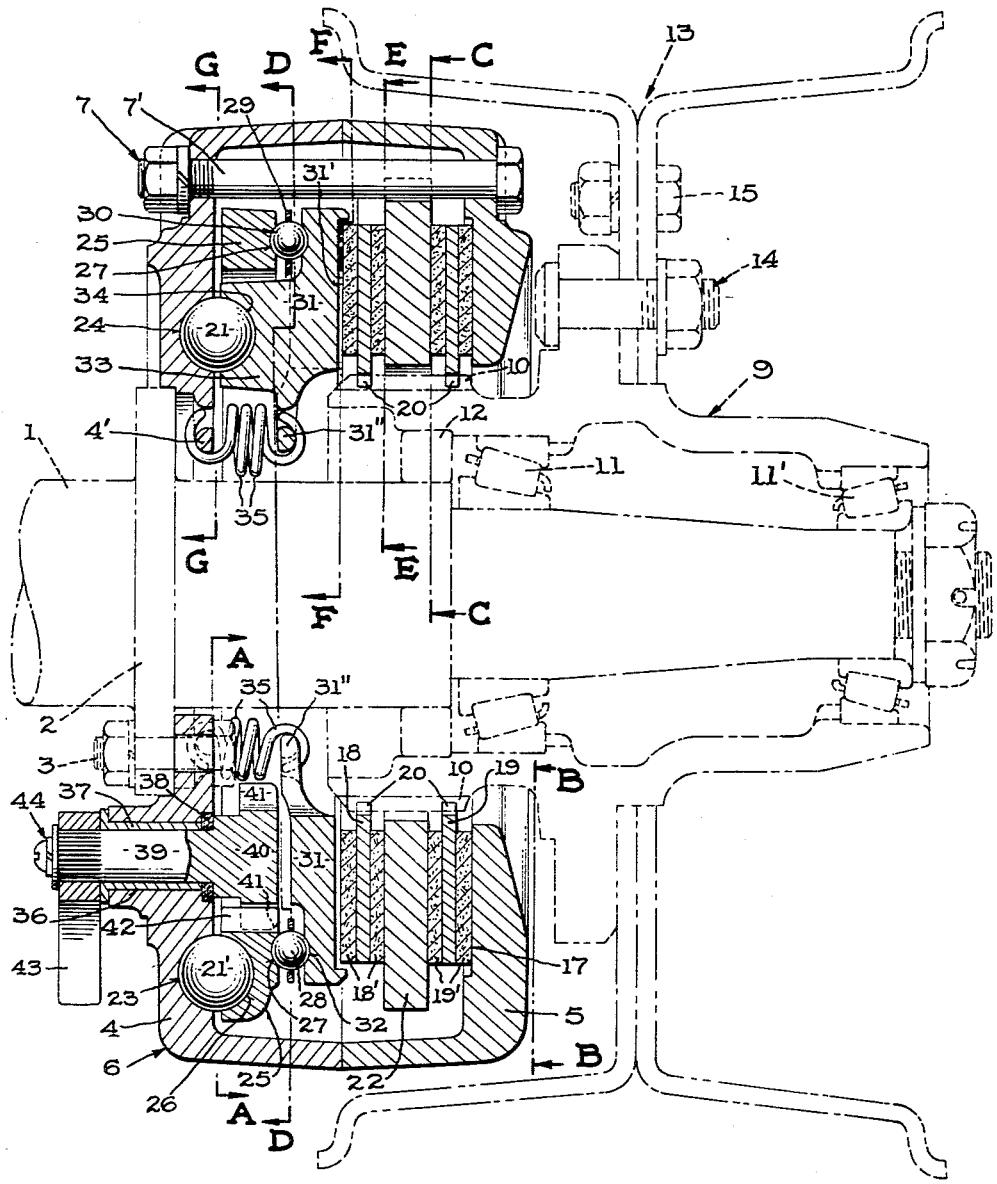
Fig. 1 is a cross-sectional view through one illustrative form of the improved brake and novel actuator means, as seen substantially on line 1—1 of Fig. 2, with certain parts shown in full elevation, and as applied to a typical wheel mounting shown in broken outline.

Like reference characters designate corresponding parts in the several figures of the drawings, wherein for the purpose of illustrating one practical embodiment, a wheel brake associated with a non-rotating axle generally designated 1 is shown, said axle being provided with a suitably apertured mounting flange 2 and being shown in dotted outline. Securely anchored by means of bolt and nut assemblies 3 to flange 2 is a centrally apertured inboard housing member 4 which, as illustrated, is provided with an axially extended peripheral flange which meets in abutting relation with a similarly formed outboard housing member 5 to comprise a preferably two-part stationary housing 6. The two-part housing is secured together by means of a plurality of circumferentially spaced tie-bolt and nut assemblies 7 (best seen in Fig. 1). A pair of dowel pins 8, 8 are used to assure a more rigid assembly and more positive alignment of the two housing members (best seen in Figs. 2 and 4).

A wheel hub 9 having externally formed splines 10 is suitably mounted on axle 1 with appropriate roller bearing assemblies 11 and 11' and oil seal 12 disposed therebetween. A wheel 13 is mounted on the hub 9 by means of bolt and nut assemblies 14, while bolt and nut assemblies 15 hold the two halves of the wheel 13 itself together. The aforementioned parts are shown in dash-dot outline and are not intended as limiting the brake features to which the invention is particularly directed.

The respective housing members, when assembled, form a hollow brake housing or shell 6 within which the actuating and friction disc means are housed. The inner face of outboard housing member 5 is provided with a radially extended friction surface 17 for frictional engagement with other friction disc means to be more fully described hereinafter.

The friction disc means aforesaid comprises a pair of friction discs 18 and 19 of annular form, which are provided with splines 20 at their inner peripheries for engagement with splines 10 of the wheel hub 9, said friction discs being free for axially shiftable movements, while being positively connected with said hub member for rotation therewith. Each disc 18 and 19 is further provided on its opposite faces with friction lining elements 18' and 19' respectively.

Interposed between the friction discs 18 and 19 is a stator disc 22 which serves as an intermediate pressure plate and is notched at a plurality of circumferentially spaced points on its outer periphery for axial sliding engagement on the correspondingly spaced housing tie-bolts 7' that hold the two-part housing together. The stator disc 22 is apertured through its center for clearance about the splines of wheel hub 9, and is provided with annular friction surfaces on both faces for frictional engagement with adjacent brake lining elements 18' and 19' of the adjacent friction discs 18 and 19, respectively.

The inboard housing member 4, which acts as a back-up or power plate for the actuating means, is provided with two sets of ramped seats on its inner face to receive camming balls 21 and 21' therein, one set of seats 23 being formed near the outer periphery and the other set of seats 24 being formed nearer the inner periphery, as best seen in Figs. 6–8.

Figure 5:
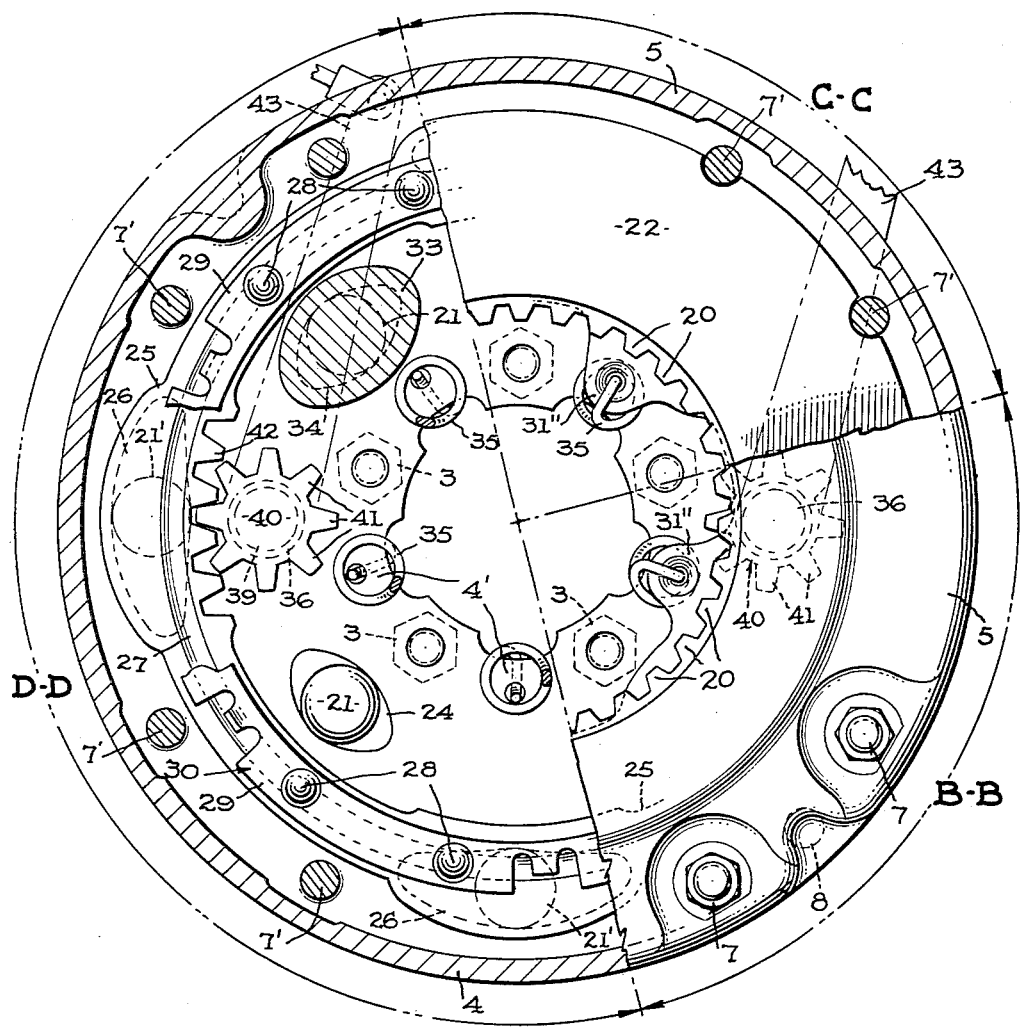
Fig. 5 is a composite sectional and elevational view as seen from the outboard side of the brake assembly, with quadrant sector B—B shown in full elevation, while the other sectors C—C and D—D are different cross-sectional views as seen substantially on the correspondingly designated section lines of Fig. 1.

An actuating ring 25 is provided on one face thereof with a set of ramped seats 26 which are complementary to seats 23 in inboard housing member 4. The actuating ring 25 is maintained in a floating relationship to housing member 4 by cooperation with camming balls 21' when in assembled relationship, as best seen in Fig. 1. The oppoiste face of the actuating ring 25 is preferably provided with an annular groove or raceway 27 which receives ball bearings 28 carried by a spacer ring 29, the details of which are more clearly seen in Figs. 1 and 5, said ball bearings constituting anti-friction means to insure free rotative movements of the actuating ring 25 and a primary actuator disc 31 (to be described hereinafter) relative to one another during brake operations.

A primary actuator disc 31, having one friction face 31', is interposed between friction disc 18 and the ball bearing assembly 30, said friction face 31' being disposed contiguous to disc 18. The primary actuator disc 31, which is also centrally apertured for clearance about wheel hub 9, is provided on its opposite face with an annular raceway 32 which is complementary to raceway 27 provided in actuating ring 25, to receive ball bearings 28. On the same side of the primary actuator disc 31, but within a plurality of raised or projecting boss areas 33 thereon, a set of ramped seats 34 is provided in complementary opposed relation to the set of ramped seats 24 on the inboard housing member 4. The camming balls 21 are contained within the last-mentioned complemental seats and together with ball bearings 28, serve to maintain the primary actuator disc 31 in its proper assembled relationship to the other components of the brake. The primary actuator disc 31 is also maintained in a floating relationship to inboard housing member 4 by cooperation with camming balls 21 and by means of a plurality of resilient return springs 35 which normally urge the primary actuator disc 31 away from friction disc 18 to maintain a normal running clearance between the friction surfaces. Each of the return springs 35 is connected to an inwardly radially extended apertured mounting ear 31'' and a correspondingly apertured skirted projection 4' which are provided on the primary actuator disc 31 and the inboard housing section 4, respectively.

Inboard housing member 4 is further preferably provided with two diametrically opposite apertures 36, 36 (Figs. 1, 2 and 5) which are suitably lined with sleeve bearings 37 and washers 38 to receive the shaft portions 39 of the two operating or actuating members in the form of pinion gears 40, 40. The teeth 41 of the pinion gears 40, 40 are disposed to operatively enmesh with complementary teeth 42 provided at diametrically opposite sectors on the inner periphery of the actuating ring 25. Because of limited rotative movement of actuating ring 25, it is not necessary for the teeth to extend completely around the inner periphery thereof. The ends of pinion gear shafts 39, 39 project exteriorly of inboard housing member 4 and are provided with longitudinal serrations thereabout to mate with complementally formed serrations on the inner periphery of the respective mounting holes of a pair of operating levers 43, 43. The operating levers 43, 43 are secured to the pinion gear shafts by means of washer, lock-washer, and screw assemblies 44, 44, or in any other suitable manner.

Various ways of connecting the two operating levers together and with a standard brake operating means may be devised, and as illustrative of one simple and effective arrangement, Fig. 2 shows a pair of rods or cables 45 having one end pivotally attached to each of the operating levers 43, with the other ends of the rods or cables pivotally secured to an equalizer arm or link 46, which in turn is connected to the main cable or rod 47 of the brake operating mechanism of the vehicle. An alternative arrangement for connecting the operating levers 43, 43, with the brake operating mechanism is shown in Fig. 3, wherein a flexible cable 48 is employed around a pulley 49 to equalize the operating force applied to the levers during operation, and the pulley 49 is in turn pivotally connected with the main cable or rod 47 of the brake operating mechanism.

Although there have been two operating levers illustrated, it is to be noted that the brake can be effectively operated or actuated by a single pinion gear and a single operating lever. However, the two operating levers are preferred to insure a more smooth and balanced operation. In order to operate the brake of this invention, a pulling force exerted on the main cable or rod 47 is equally distributed to the two operating levers through the equalizing means aforesaid. As the operating levers 43, 43 move in the direction of pull, they cause pinion gears 40, 40 to rotate, which in turn effects limited rotation of the actuating ring 25. As the actuating ring 25 begins to rotate, it causes the camming balls 21' nearer the outer periphery of inboard housing member 4 to begin to climb up their complementary ramped seats 23 and 26 in the inboard housing member 4 and actuating ring 25, respectively. This camming action forces the actuating ring 25 to move axially outward, whereupon the primary actuator disc 31, through means of the interposed ball bearing assembly 30, is moved axially into frictional contact with the rotary friction disc member 18, and then continues to effect frictional interengagement of the axially slidable friction disc member 18 with axially slidable stator disc 22 and friction disc member 19, and then with the friction face 17 of outboard housing member 5.

During the rotation of member 18 in either direction, and as the aforementioned frictional contact is made, drag torque of the rotating disc member 18 is imparted to primary actuator disc 31, whereupon it tends to rotate, and in so doing, the camming balls 21 nearer the inner periphery of inboard housing member 4, riding in their complemental ramped seats in said housing member 4 and the raised boss areas 33 of primary actuator disc 31, respectively, begin to climb up their ramped seats and thereby become "energized"—a function that is well-known in the art. However, the set of camming balls 21' nearer the outer periphery of the brake housing are precluded from becoming self-energized due to the "free wheeling" afforded by ball bearing assembly 30, and the fact that the ramps of ball seats 24, 34 are steeper than the ramps of ball seats 23, 26. As the aforementioned self-energization occurs, considerable additional force is exerted to effectively interengage the friction surfaces of the brake, thereby insuring a powerful braking action.

As brake lining wear occurs, compensating adjustment therefor can be achieved by removing the operating levers 43, 43 and setting them rotatively further around on their respective serrated shafts 39, 39 in the amount required to compensate for the lining wear.

It will be apparent from the foregoing that the objectives and resultant advantages as set forth in the preamble hereof are fully met by a brake constructed in accordance with this invention, and that equally efficient operation of the brake will occur, regardless of the direction of rotation of the wheel or other rotary member to be braked to which the brake assembly is applied.

While the specific details have been herein shown and described, the invention is not confined thereto as various changes and alterations may be made without departing from the spirit and scope thereof as defined in the appended claims.

We claim:

1. A friction device of the class described, comprising a housing, friction means in said housing including a rotary axially shiftable friction disc and an actuator disc disposed for limited rotative and axially shiftable movements relative to said housing, camming means interposed between said housing and said actuator disc for axially shifting said actuator disc to effect frictional interengagement of the friction means with each other and with said housing responsive to relative rotation between said actuator disc and the housing, operating means for initially shifting the actuator disc axially into torque-responsive engagement with the rotary friction disc aforesaid, said operating means including peripherally engaged and directly enmeshed relatively rotatable members disposed to convert a tangential actuating force into a uniformly distributed axial friction-applying force acting upon the actuator disc, means normally urging said actuator disc away from frictional interengagement with the rotary friction disc to provide a running clearance therebetween, said operating means further including a rotatable and axially shiftable actuating ring disposed intermediate said housing and said actuator disc, camming means interposed between said actuating ring and said housing and being responsive to rotation of said ring to impart axial shifting movements thereto, and anti-friction means interposed between said actuating ring and actuator disc, said actuator disc being maintained in floating relationship to said housing by the camming means between the actuator disc and the housing, and the means normally urging the actuator disc away from frictional interengagement with the rotary friction disc to provide a running clearance therebetween comprising resilient members securing the actuator disc to the housing.

2. A friction device of the class described, comprising a housing, friction means in said housing including a rotary axially shiftable friction disc and an actuator disc disposed for limited rotative and axially shiftable movements relative to said housing, camming means interposed between said housing and said actuator disc for axially shifting said actuator disc to effect frictional interengagement of the friction means with each other and with said housing responsive to relative rotation between said actuator disc and the housing, operating means for initially shifting the actuator disc axially into torque-responsive engagement with the rotary friction disc aforesaid, said operating means including peripherally engaged and directly enmeshed relatively rotatable members disposed to convert a tangential actuating force into a uniformly distributed axial friction-applying force acting upon the actuator disc, means normally urging said actuator disc away from frictional interengagement with the rotary friction disc to provide a running clearance therebetween, said operating means further including a rotatable and axially shiftable actuating ring disposed intermediate said housing and said actuator disc, camming means interposed between said actuating ring and said housing and being responsive to rotation of said ring to impart axial shifting movements thereto, anti-friction means interposed between said actuating ring and actuator disc, said actuator disc being maintained in floating relationship to said housing by the first-mentioned camming means interposed between the actuator disc and the housing, and the first-mentioned camming means comprising balls disposed in oppositely inclined and opposed ramped seats provided in the housing and actuator disc respectively, and the second-mentioned camming means comprising balls disposed in oppositely inclined and opposed ramped seats provided in the housing and the actuating ring respectively, the inclination of the ramps of the first-mentioned camming means being greater than the inclination of the ramps of the second-mentioned camming means.

3. A friction device of the class described comprising a housing, friction means in said housing including a rotary axially shiftable friction disc and an actuator disc disposed for limited rotative and axially shiftable movements relative to said housing, camming means interposed between said housing and said actuator disc for axially shifting said actuator disc to effect frictional interengagement of the friction means with each other and with said housing responsive to relative rotation between said actuator disc and the housing, operating means for initially shifting the actuator disc axially into torque-responsive engagement with the rotary friction disc aforesaid, said operating means including peripherally coacting and directly interengaged relatively rotatable members disposed to convert a tangential actuating force into a uniformly distributed axial friction-applying force acting upon the actuator disc, means normally urging said actuator disc away from frictional interengagement with the rotary friction disc to provide a running clearance therebetween, the operating means aforesaid including a pair of diametrically oppositely disposed rockable shafts extending from the exterior to the interior of said housing, said shafts being provided at their respective interior ends with an operator head for operative engagement with the actuator disc, separate means in the form of operating levers engaged with the respective exterior ends of said shafts for imparting rocking operating motion to said shafts, and a common operator means interconnecting the operating levers, said common operator means comprising an equalizer link connected at its opposite ends with said levers and adapted to be pivotally connected at its midpoint with a common operating-force-applying instrumentality.

4. A friction device of the class described comprising a housing, friction means in said housing including a rotary axially shiftable friction disc and an actuator disc disposed for limited rotative and axially shiftable movements relative to said housing, camming means interposed between said housing and said actuator disc for axially shifting said actuator disc to effect frictional interengagement of the friction means with each other and with said housing responsive to relative rotation between said actuator disc and the housing, operating means for initially shifting the actuator disc axially into torque-responsive engagement with the rotary friction disc aforesaid, said operating means including peripherally coacting and directly interengaged relatively rotatable members disposed to convert a tangential actuating force into a uniformly distributed axial friction-applying force acting upon the actuator disc, means normally urging said actuator disc away from frictional interengagement with the rotary friction disc to provide a running clearance therebetween, the operating means aforesaid including a pair of diametrically oppositely disposed rockable shafts extending from the exterior to the interior of said housing, said shafts being provided at their respective interior ends with an operator head for operative engagement with the actuator disc, separate means in the form of operating levers engaged with the respective exterior ends of said shafts for imparting rocking operating motion to said shafts, and a common operator means interconnecting the operating levers, said common operator means comprising an equalizing pulley having a flexible member extended thereabout and connected at its opposite ends with the respective levers, said pulley being adapted to be pivotally connected on its central axis with a common operating-force-applying instrumentality.

5. A friction device of the class described, comprising a housing, friction means in said housing including a rotary axially shiftable friction disc and an actuator disc disposed for limited rotative and axially shiftable movements relative to said housing, camming means interposed between said housing and said actuator disc for axially shifting said actuator disc to effect frictional interengagement of the friction means with each other and with said housing responsive to relative rotation between said actuator disc and said housing, operating means for initially shifting the actuator disc axially into torque-responsive engagement with the rotary friction disc aforesaid, said operating means including peripherally engaged and directly enmeshed relatively rotatable members disposed to convert a tangential actuating force into a uniformly distributed axial friction-applying force acting upon the actuator disc, said relatively rotatable members comprising a rockable shaft extending from the exterior to the interior of said housing, an operator head in the form of a pinion gear provided on the interior end of said rockable shaft, a relatively rotatable and axially shiftable actuating ring provided with teeth for complemental peripheral engagement with said pinion gear and being disposed intermediate said housing and said actuator disc, camming means interposed between said actuating ring and said housing and being responsive to rotation of said ring to impart axial shifting movements thereto, anti-friction means interposed between said actuating ring and the actuator disc to impart axial movement of said ring to said actuator disc while allowing free rotative movements of said actuator disc relative to said ring, said actuator disc being maintained in floating relationship to said housing by the camming means interposed therebetween, and resilient means securing the actuator disc to said housing for yieldably maintaining a running clearance between the actuator disc and the rotary friction disc.

References Cited in the file of this patent

UNITED STATES PATENTS

| | | |
|---|---|---|
| 1,542,290 | Dumont | June 16, 1925 |
| 2,024,328 | Batie | Dec. 17, 1935 |
| 2,071,107 | Blatt | Feb. 16, 1937 |
| 2,153,280 | Shelor | Apr. 4, 1939 |
| 2,185,435 | Goepfrich | Jan. 2, 1940 |
| 2,245,987 | Lambert | June 17, 1941 |
| 2,262,708 | Lambert | Nov. 11, 1941 |
| 2,375,855 | Lambert | May 15, 1945 |
| 2,422,713 | Benson | June 24, 1947 |
| 2,778,452 | Dasse | Jan. 22, 1957 |
| 2,786,560 | Ishoy | Mar. 26, 1957 |

FOREIGN PATENTS

| | | |
|---|---|---|
| 818,005 | Germany | Oct. 22, 1951 |